(12) United States Patent
Kazmierczak

(10) Patent No.: US 6,851,708 B2
(45) Date of Patent: Feb. 8, 2005

(54) DEVICE FOR TRANSFERRING DATA AND/OR ENERGY TO RESTRAINING MEANS IN A VEHICLE

(75) Inventor: Harald Kazmierczak, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 158 days.

(21) Appl. No.: 10/239,664
(22) PCT Filed: Dec. 14, 2001
(86) PCT No.: PCT/DE01/04762
§ 371 (c)(1), (2), (4) Date: Jan. 8, 2003
(87) PCT Pub. No.: WO02/058966
PCT Pub. Date: Aug. 1, 2002

(65) Prior Publication Data
US 2004/0036354 A1 Feb. 26, 2004

(30) Foreign Application Priority Data
Jan. 24, 2001 (DE) .......................... 101 02 994

(51) Int. Cl.$^7$ .............................. B60R 21/32
(52) U.S. Cl. ........................ 280/735; 180/274; 340/436
(58) Field of Search ............................... 280/735, 730.2; 180/268, 274, 282; 340/436; 439/15

(56) References Cited

U.S. PATENT DOCUMENTS 4,904,196 A    2/1990  Sueyoshi et al.

FOREIGN PATENT DOCUMENTS

| DE | 195 12 500 | 10/1995 |
| DE | 195 39 070 | 4/1997 |
| DE | 196 44 219 | 11/1997 |
| DE | 197 44 760 | 3/1999 |
| EP | 0 357 829 | 3/1990 |
| EP | 0 437 642 | 7/1991 |

*Primary Examiner*—Eric Culbreth
(74) *Attorney, Agent, or Firm*—Kenyon & Kenyon

(57) ABSTRACT

A device is provided for transmitting data or energy to a system of restraint in a vehicle, which is used for connecting movable vehicle parts by a transformer. According to an exemplary embodiment of the present invention, a reed contact is provided on the secondary side of the transformer which short-circuits the winding or the coil when the movable part is removed. This short-circuit prevents an induction voltage from leading to an undesired triggering of the restraint arrangement.

3 Claims, 1 Drawing Sheet

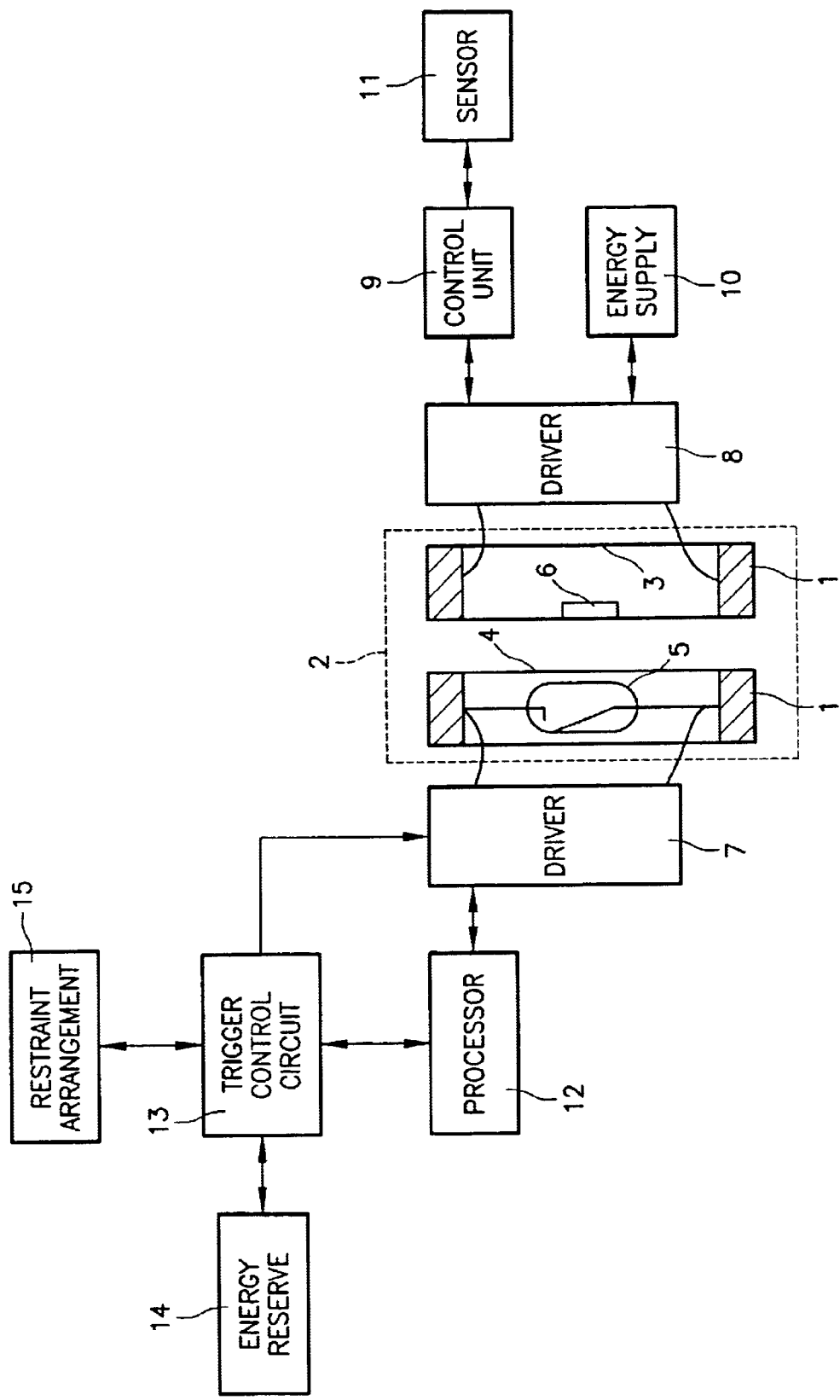

DEVICE FOR TRANSFERRING DATA AND/OR ENERGY TO RESTRAINING MEANS IN A VEHICLE

FIELD OF THE INVENTION

The present invention relates to a device for transmitting data and/or energy to a restraint system.

BACKGROUND INFORMATION

It is conventional to install transformers for transmitting data and energy to a restraint arrangement in movable parts such as a seat or a steering wheel. Such transformers may be used particularly for restraint systems. In this context, the seat in question may be removed or replaced again. The transmission of data and energy may have to function again after the replacement. By the use of transformers, and thereby of near-field transmission, the negative influence on a restraint system due to wear or unreliability of plugs may be avoided. The secondary side of the transformer in question is positioned, in this instance, in the seat or steering wheel, while the primary side is connected directly to the chassis.

SUMMARY OF THE INVENTION

According to an exemplary embodiment of the present invention, the device for data and/or energy transmission to a restraint arrangement in a vehicle may have the advantage that an induction voltage, which is naturally created because of the law of induction when a movable vehicle part is removed, is short-circuited at the secondary side and thus cannot lead to a false release of the restraint system. A reed contact maybe used for this, which is situated on the secondary side, while the primary side has a corresponding magnet, so that, when the magnet is removed, the reed contact is closed. This may then lead to a short-circuit of the winding of the secondary side. The induced voltage at the secondary side may thereby also be short-circuited. This may improve the security of the vehicle. The first vehicle part may be designed as the chassis and the second vehicle part as a seat, with the seat being removable. In this context, the restraint arrangement, as well as a diagnosis arrangement and an activation arrangement for the restraint arrangement, may be on the secondary side.

BRIEF DESCRIPTION OF THE DRAWING

FIG. 1 shows a block diagram of the device according to an exemplary embodiment of the present invention.

DETAILED DESCRIPTION

Since air bags, particularly for side collisions, are also installed in seats, data transmission to the electronics system of the restraint arrangement in the seat may be important. This data transmission may be accomplished with better handling, less soiling and greater robustness by using transformers. However, using transformers may cause the problem of an induction voltage which appears when the seat is removed and also when it is replaced. This problem may be increased in vehicles like sports utility vehicles (SUV's), where it may be expected that the user may frequently remove one or more seats.

Therefore, according to an exemplary embodiment of the present invention, a reed contact is provided which closes when the seat is removed and thus short-circuits the winding of the secondary side of the transformer which is in that seat. Thereby induction voltages, which are created at the secondary side and which could possibly trigger the restraint arrangement, are also short-circuited.

FIG. 1 shows in a block diagram the device according to an exemplary embodiment of the present invention. A transformer 2 has a primary side 3 and a secondary side 4. Primary side 3 is accommodated in the chassis while secondary side 4 is situated in the seat. Primary side 3 and secondary side 4 each have coils 1, coils 1, 1 are respectively connected to drivers 7 and 8. On primary side 3 there is also a magnet 6, which is installed approximately opposite a reed contact 5, reed contact 5 being situated on the secondary side of transformer 2. In the installed state, reed contact 5 is open because of magnet 6. Thereby data, which are transmitted by the magnetic coupling, via near-field transmission, from primary side 3 to secondary side 4 are taken up by driver 7. In addition to data, energy may also be transmitted here, because the restraint arrangement, such as air bags and belt tensioners in the seats, having the control electronics, have to be supplied with electrical energy. Furthermore, on the secondary side, an energy reserve for the restraint arrangement is present, so that even when the energy supply is terminated, the restraint arrangement may be triggered.

At driver 8, on the one hand an energy supply 10, and on the other hand a control unit 9 are connected via data input/outputs. Control unit 9 is connected to a sensor 11 via its second data input/output which indicates an impact. As an example here, only one sensor is shown, which in this case is an acceleration sensor, but additional sensors may be positioned here too, and in particular in control unit 9 itself. The connections to these sensors may be made using a bus.

Control unit 9 computes the triggering algorithm and evaluates data coming from the restraint arrangement, that is, above all diagnosis data. In the case of an impact which calls for triggering the restraint arrangement, control unit 9 will transmit an appropriate instruction via transformer 2, and thereby a firing instruction is transmitted.

A trigger circuit control 13 is connected to driver 7 via a first data input/output, and a processor 12 is connected to driver 7 via a second data input/output. Processor 12 performs diagnoses on the assemblies situated on the secondary side. Trigger circuit control 13 activates restraint arrangement 15, which is connected to trigger circuit control 13 via a third data input/output. An energy reserve 14 is also connected to trigger circuit control 13 via a data input/output. Energy reserve 14 may be, for instance, a capacitor, which may still deliver energy in the case of an interruption of the connection between the primary side and the secondary side, in order to control restraint arrangement 15 appropriately. Restraint arrangement 15 in this case is an air bag, but a belt tensioner is also possible. Trigger circuit control 13 may also execute diagnoses, including whether firing pellet resistances, by which restraint arrangement 15 is fired, still have the correct resistances and thereby make possible proper functioning.

What is claimed is:

1. A device for at least one of data transmission and energy transmission to a restraint arrangement in a vehicle, comprising:

a transformer including a primary side in a first vehicle part and a secondary side in a second vehicle part, at least one of the first vehicle part and the second vehicle part being removable;

wherein the secondary side includes a reed contact and the primary side includes a magnet, and, when one of the first vehicle part and the second vehicle part is removed, the reed contact closes and short-circuits a winding of the secondary side.

2. The device as recited in claim 1, wherein the first vehicle part is a chassis and the second vehicle part is a seat.

3. The device as recited in claim 1, wherein the restraint arrangement, a restraint-arrangement diagnosis arrangement, and a restraint-arrangement controlling arrangement are situated on the secondary side.

* * * * *

UNITED STATES PATENT AND TRADEMARK OFFICE
CERTIFICATE OF CORRECTION

PATENT NO. : 6,851,708 B2
DATED : February 8, 2005
INVENTOR(S) : Harald Kazmierczak It is certified that error appears in the above-identified patent and that said Letters Patent is hereby corrected as shown below:

Column 1,
Line 34, change "contact maybe used" to -- contact may be used --

Column 2,
Line 10, change "each have coils 1, coils 1, 1 are" to -- each have coils 1, 1. Coils 1, 1 are --

Signed and Sealed this

Seventh Day of June, 2005

JON W. DUDAS
*Director of the United States Patent and Trademark Office*